July 23, 1935. E. G. BUDD 2,009,353
PNEUMATIC TIRE
Filed Sept. 30, 1931 2 Sheets-Sheet 1
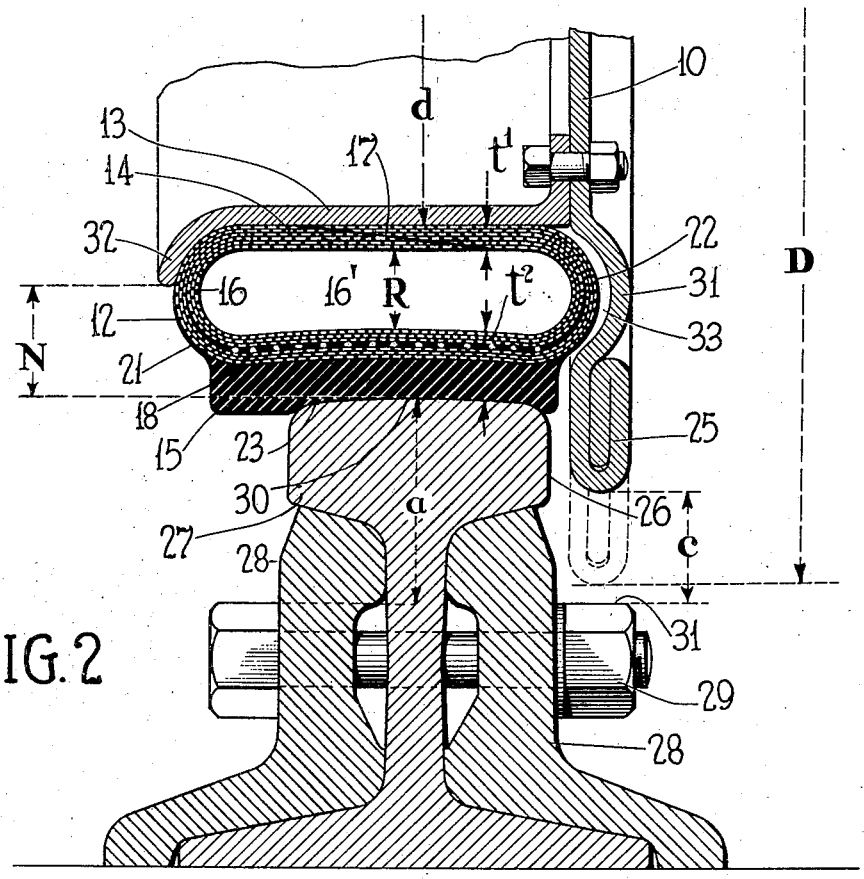
FIG. 2
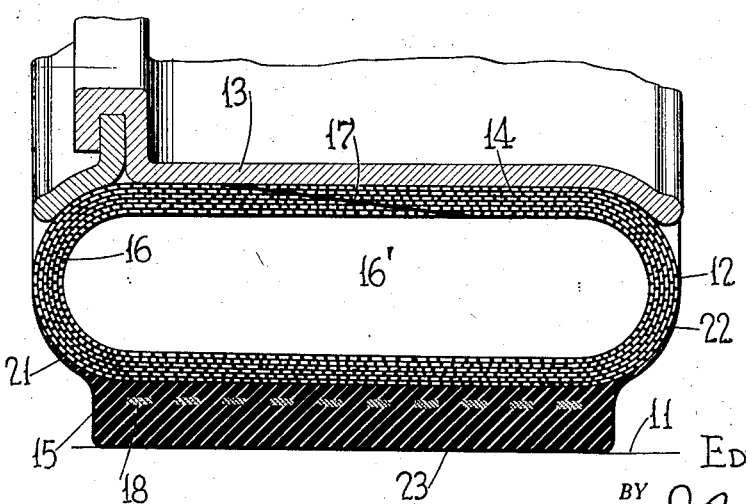
FIG. 1
INVENTOR.
EDWARD G. BUDD
BY
ATTORNEY.

July 23, 1935.   E. G. BUDD   2,009,353
PNEUMATIC TIRE
Filed Sept. 30, 1931   2 Sheets-Sheet 2

INVENTOR.
EDWARD G. BUDD
BY
ATTORNEY.

Patented July 23, 1935

2,009,353

UNITED STATES PATENT OFFICE 2,009,353

PNEUMATIC TIRE

Edward G. Budd, Philadelphia, Pa., assignor to Edward G. Budd Manufacturing Co., Philadelphia, Pa., a corporation of Pennsylvania Application September 30, 1931, Serial No. 566,020

9 Claims. (Cl. 295—31)

In pneumatic tired vehicles of all kinds it is highly desirable to limit the amount of drop of the wheel body at large with respect to the roadway upon the occurrence of deflation brought about by whatever means. When through the deflation of a tire the wheel body drops toward the roadway or upon it, a number of very disadvantageous things occur with various vehicles and on various kinds of roadways. In the instance of the usual passenger or commercial automobile it immediately becomes impracticable to run the vehicle at anything above quite a slow speed without damage to the tire or the rim, not to mention the occasional danger when deflation occurs at high speed of causing an accident to the car as a whole either through the throwing of a tire or through impact of the unyielding wheel body or rim with road irregularities or both. Undue drop of the wheel toward the roadway moreover causes undue strains on chassis and body, especially when the vehicle is heavily loaded, and considerable discomfort to passengers. Such a condition needs be remedied as early as possible and the customary practice is to stop the automobile and change tires at once. But sometimes before this can be done untoward results have already happened.

In a railway vehicle traveling on standard railway tracks on pneumatic tires, it is wholly impractical to stop a vehicle at once and change tires for the reason that railway schedules must be unfailingly kept. Moreover, in the case of railway vehicles if the drop of the wheel at large toward the the roadway is over much, the wheel retaining flange may strike fish plates and bolts and other obstructions at any time lying in the plane of the flange of the wheel, with possible damage to both wheel and trackway, and if the railway vehicle be traveling at very high speed when such a thing happens, there is danger of wrecking either through breakage of the parts as they impact together at high speed or through jumping of wheels and trucks from the track.

There have heretofore been proposed certain constructions of tires per se and tires and wheels in combination which have been alleged to so limit the extent of possible dropping of the wheel as a whole toward the roadway as to eliminate to some degree at least certain of the foregoing untoward results but not all of them. It is broadly the object of my invention to eliminate each and all of the untoward results to a sufficiently high degree to obtain thoroughly practical operation for all classes of vehicles on all classes of roadways, and to eliminate the most serious of those untoward results altogether, having reference now particularly to the danger of accident due to impacting of the wheel with the irregularities of road surfaces and to the fouling of the wheels of railway cars with parts of the track other than the head of the rail. In fact, the outstanding advantage of my invention is the latter and the construction of tire and wheel which I propose has been especially evolved toward this end.

Over and above this broad object, it has been a principal aim to reduce the weight of a wheel structure at large, to simplify it, and to reduce its cost. Reduction of cost comes about largely by virtue of the attainment of simplicity and low weight. A more important factor in the operation of any vehicle is simplicity of those devices which enter into tire and wheel replacements whereby they may be handled efficiently by every sort of person with the minimum expenditure of time. But in high speed vehicles especially, reduction of weight is important because smoothness of running is in considerable part dependent upon the degree to which the unsprung weight of the running gear can be reduced.

Generally speaking, I attain such objects through combining with the wheel body a tire which embodies within its own structure as a tire per se the means for limiting the radial drop of the wheel body upon deflation of the tire. In other words, I utilize a tire the radially inward and the radially outward walls of which are so related to each other and are of such transverse cross section as to limit the radial drop of the wheel with respect to the roadway upon deflation of the tire. Yet more specifically, I employ a tire which in transverse cross section is transversely oblong in form and embodies a transversely oblong air space of relatively small radial depth as compared with the standard automobile tire. Particularly when combined with the wheel of a railway vehicle, such a construction enables me to use a relatively short vehicle retaining flange on the wheel body. Moreover, I embody in the radially outward wall means to preclude expansion of the tire upon inflation even under high pressure beyond a pre-determined limit thus insuring adequate depth of engagement of the wheel retaining flange under all conditions of service of the wheel and under all conditions of wear of the tire.

In the accompanying drawings several modifications of my invention are shown but it should be understood at the outset that there are many of them.

Of the drawings—

Figure 1 is a transverse cross section of the outer portion of an automobile wheel in which my invention is embodied.

Figure 2 is a similar cross section of a railway vehicle wheel in combination with a railway track, embodying my invention.

Figure 3:
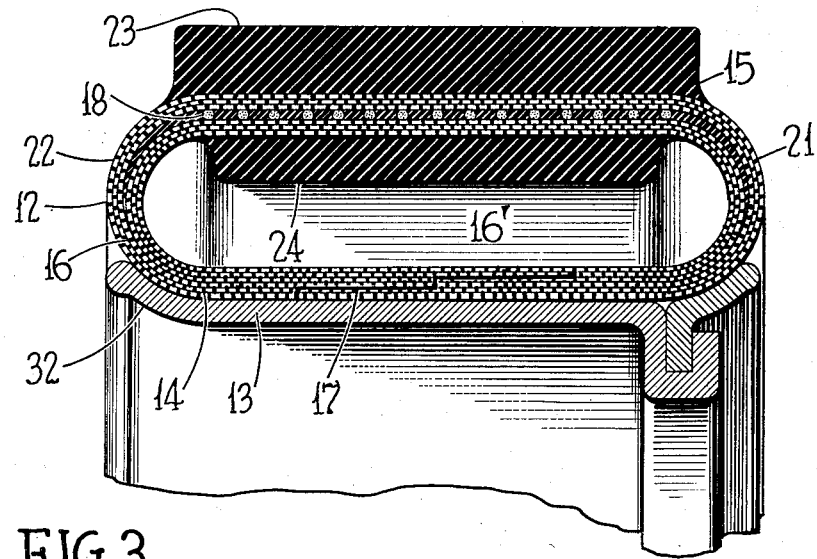
Figures 3 and 4 are similar transverse cross sections of modifications.

The main body of the wheel where shown, is designated 10. The upper surface of the roadway is designated 11. The intervened pneumatic tire is designated 12 and the rim base of the wheel upon which the tire is mounted and secured is designated 13. The radially inner wall of the tire is designated 14 and the radially outer wall 15 while the air space is designated 16'.

In each of the embodiments of my invention illustrated the radially inner and outer walls are of substantially cylindrical form and of substantially uniform thickness respectively, and their several surfaces, inner and outer as respects the air space, are substantially parallel with each other. The general transverse cross section is oblong and the general shape of the air space embodied is transversely oblong. The radial depth of the air space is relatively small as respects its transverse width. In these forms disclosed the major axis of the cross section of the air space is manifold that of the minor axis. Specifically, the radial depth of air space on the minor axis of the oblong axis is only a fraction of the radial depth of air space of the usual standard automobile tire. Since this depth measures the degree of possible drop of the wheel toward the roadway on deflation of the tire, the drop of the wheel as a whole toward the roadway is thereby limited. The form of the radially inner and outer walls renders such drop uniform transversely of the tire, uniformly limits it to the small degree, and furthermore, affords a uniform solid rubber cushioned support upon deflation incident to the uniform general engagement of the radially inner and outer walls with each other when the tire is deflated.

The details of construction of the tire thus embodying within itself means for limiting the radial drop of a wheel with respect to the roadway differ somewhat as between the several modifications shown, but in the main they are the same. Commonly, as shown, the tires embody cords or bands of tension resisting material wound transversely of the tire and commonly designated 16. These cords or bands may be wound according to any of the known patterns used in connection with the manufacture of pneumatic tires to any end whatsoever which may have been heretofore attained or may in the future be desired. The various lacings and inter-lacings of such bands and their various directions may be determined with a view to any of those factors entering into the ends of strength, durability, contouring, flexibility, economy of manufacture, etc., which may be desired. These transversely extending bands and cords moreover may extend entirely around the transverse cross section or only partly around. In each of the forms of Figs. 1-3, I have shown them dis-continuous in the inner wall 14 along the line 17 which line is the parting line of the original form vulcanization and represents the surface or surfaces upon which the vulcanized tire is parted to permit the removal of the cores upon which the tire is built and which determine the form of its air space. After vulcanization and removal of the core, the surfaces separated along the lines 17 are vulcanized, cemented or otherwise secured together to render the tire an air tight single tube structure by any known vulcanizing, cementing or other and equivalent means to secure the same end. In Fig. 1 the line 17 is an oblique line representing the conical surfaces of the joint. In Fig. 3 the line 17 is a zig-zag line representing stepped conical or cylindrical surfaces of division. Each has its own merits and either may be used.

Figure 4:
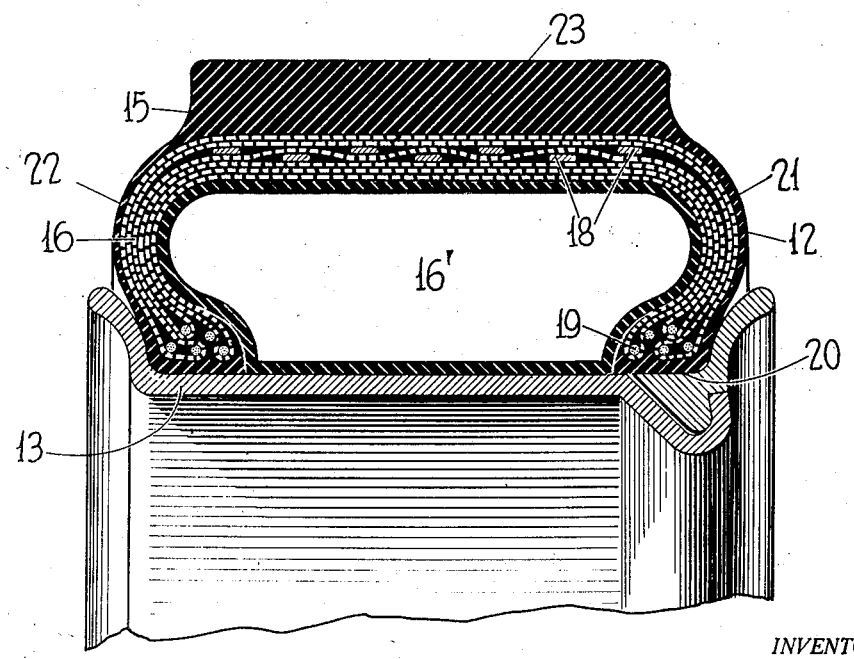

The tires of Figs. 2, 3 and 4 each embody in addition to the transverse winding 16 in the radially outer wall 15 an annular winding 18 wound continuously or otherwise circumferentially of the outer wall. In Fig. 1, this winding is of tape or belt like fabric. In Figs. 2 and 3 this winding is illustrated as a cordage or wire in the nature of a stranded cable comprising a plurality of individual strands as most clearly shown in Fig. 3. It may be of metal bands or strips, as in Fig. 4. It is illustrated in between layers of the transverse winding 16. It may be outside, or partly outside and partly inside. Likewise it may lie either inside or outside of the transverse winding 16 as a whole. Characteristically, however, this circumferential winding is of substantially uniform diameter and of a strength sufficient to preclude expansion beyond a determinate diameter and thereby to limit the expansion of the tire under all conditions of pressure to a pre-determined diameter and likewise to restrict the shape of the outer peripheral wall to a cylindrical shape of a determinate diameter.

The form illustrated in Fig. 4 embodies annular wire windings 19 also in the heels 20 of the tire. Such heels and such winding may also be used in the forms of Figs. 1-3. So it would serve to prevent lift of the ends of the inner wall 14 under adverse conditions.

These bands and cordages collectively constitute what is commonly known as the carcass of the tire and as heretofore intimated, this carcass may have a great number of forms. It is outstandingly, however, a feature of my invention to provide the winding 18 annularly wound, or an equivalent means to insure the attainment and retention of the oblong cross section. Such cords may be omitted if desired, and in such event such interlacing of transverse cordages and such strength of their bonding to each other is provided through the vulcanizing process or other means as is necessary to insure the retention of the oblong, preferably the cylindrical oblong form. If the tension taking means of a tire are adequately bonded together during the vulcanizing process or otherwise, the form of the tire given it during the vulcanizing process will be retained under the application of all strains less in degree than the degree of such bonding and the resistance of the tension taking means.

According to my invention I particularly provide against dis-advantageous application of strain by connecting the radially inner walls 14 with the radially outer walls 15 by lateral walls 21 and 22 of substantially semi-circular cross section thereby applying the strains incident to distension of the lateral wall as transverse forces in direction in extension of the lateral extremities of the radially inner and outer walls 14 and 15. Moreover, such semi-circular form being the natural form of distension incident to uniform application of fluid pressure, the side walls 21—22 themselves may be made lighter for the same strength and especial means for supporting outwardly against internal pressure is obviated.

The rim base 13 is preferably of cylindrical form thus giving the radially inner wall 14 under pressure cylindrical form and supporting it without special means embodied in the tire itself. Thus, when the uniform thickness of the radially inner and outer walls 14 and 15 respectively is considered, there is afforded a solid support upon tire deflation of the combined walls 14—15, of uniform thickness and very substantial stability as compared with forms which might be substantially irregular.

The tread 23 of the wheel which bears upon the roadway is provided with the usual large mass of solid rubber to take the current wear and to provide for the absorption of minor roadway irregularities.

In the form shown in Fig. 3 a similar mass of solid rubber 24 may if desired be provided to further restrict the degree of radial drop of the wheel toward the roadway upon deflation. As so provided, the mass 24 is itself of substantially uniform thickness whereby the general parallelism of the inner surfaces of the cross section is maintained and the stability referred to achieved in this form as well. This modification is especially adapted for use in cases where the volume of the air space needs be adjusted. It is also of some advantage in limiting the degree of flexure of the end walls 21 and 22 upon deflation and thereby minimizing the danger of pinching of these sections of the tire if a run of any extent is made on a deflated tire.

The embodiment of my invention shown in Fig. 2 I regard as of very great importance in that in its combination with a wheel of a railway vehicle and a trackway thereof it constitutes at once the simplest, lightest and most effectual means of preventing damage to tires and accidents to railway vehicles due to deflation while the vehicle is in progress, that has as yet been attained. In this modification the wheel body 10 is, of course, mounted directly upon the axle of the railway vehicle (not shown). Projected from the body 10 is a radially extending retaining flange 25 the function of which as usual in railway vehicles, is the engagement with the inner edge 26 of the rail 27 to retain the vehicle upon the trackway and guide it thereover. When the tire becomes deflated and the vehicle is traveling at speed and the wheel drops unduly, the flange 25 may strike the fish plates 28 or their retaining bolts 29 or both and damage the wheel, with the possibility of jumping the wheel from the track and causing derailment or other accident to the vehicle itself. In this embodiment of my invention I place a tire having the features heretofore outlined in such relation to the body of the wheel 10 and the flange 25 that the wheel may not drop toward the rail 27 sufficiently to carry the flange 25 into engagement with the fish plates 28 or other securing bolts 29, or into engagement with any other part which may project laterally inwardly beyond the plane of the edge 26 of the rail, or otherwise project into the path of movement of the flange 25 upon the occurrence of deflation of the tire. To this end the oblong cross section of the tire, and the thicknesses of its radially inner and outer walls 14 and 15 are such that the maximum diameter of the flange 25 minus, the diameter of the rim base 13 to which is added the combined thicknesses of the radially inward and outward walls 14 and 15, is substantially less than the distance between the head or top 30 of the rail 27 and the nearest obstruction which lies in the then pathway of the flange 25, as for example, the top 31 of the bolt 29 of the fish plate 28. This condition is shown in dotted lines in Fig. 2. Geometrically speaking, under this condition the diameter D of the flange 25 minus, the diameter $d$ of the rim base plus the thickness $t^1$ of the radially inner wall plus the thickness $t^2$ of the outer wall, is substantially less than the distance $a$ between the head 30 of the rail and the head 31 of the bolt 29. From another angle, the arrangement of this embodiment of my invention is that the maximum radial depth R of the air space 16' which defines the degree of possible drop is substantially less than the minimum clearance C between the flange 25 and the nearest obstruction in its pathway when the tire is deflated. This definition of the arrangement, of course, applies to normal running conditions whereas the preceding definition applies to abnormal running conditions when the tire is deflated. Still further, the distance N between the outer retaining flange 32 and the head 30 of the rail is greater than the radial depth R whereby the flange 32 may not strike crossing plates, etc. at rail head level.

The peculiar cross section of the tire of my invention is very advantageously accommodated in this important embodiment by offsetting the wheel body 10 and flange 25 in the intermediate zone 31 to accommodate the semi-circular cross section of that side of the tire and to reinforce its end walls if desired, while the rim base 13 on the opposite side may be carried upwardly around the semi-circular cross section of the wall 12 to any desired degree within the limits above set forth. The form of the rim base may be anything desired, the means for placing and replacing the tire thereon may likewise be anything desired, as for example, some of those shown in connection with automobile wheels in the earlier forms illustrated. Otherwise the rim base itself may be made demountable as illustrated in Fig. 2. A clearance 33 may be provided to avoid pinching of the wall 22, and also to avoid crowding over of the tread 23 on deflation. The tread may be limited in width substantially to rail head width. The available minimum clearance of flange 25 is not so unduly small as to preclude a tire of adequate radial depth when inflated.

The tire entering so prominently into my invention may be made in a number of ways. Its transverse cross-section may be actually continuous about its core during vulcanization, and subsequently cut along lines 17 to remove the core. In such case the transverse windings may be initially continuous. Otherwise the transverse winding and wall 14 may be broken at line 17 during vulcanization. In either case afterwards the surfaces meeting on line 17 can be coated with cement, the tire with core removed placed on an expanding cylindrical or tapering mandrel with the surfaces in proper lap, the mandrel expanded to impose initial pressure on the joint and then air pressure introduced within the tire and maintained to impose a higher pressure on the joint until the cement sets. Thereupon the pressure may be released, (the mandrel contracted and the tire removed). If desired, however, the tire may be initially formed as single tube tires can be formed of continuous and unbroken transverse section by any of the known or to be known methods, and the section continued unbroken permanently and without joints.

The tire of Figs. 1–3 is of the single tube type in which the walls directly take the air. Inner tubes may be used in which event the tire may be dis-continuous in its inner wall 14 as utilized in the combination of the invention and those portions which seat on the rim base and through which the tire is retained thereon may be given any of the usual and well known forms. Such a modification is illustrated in Fig. 4.

I have illustrated several modifications of my invention. From the nature of these and from a consideration of the breadth of the spirit of the invention it will be obvious that these various modifications are but a few of many possible ones. I, therefore, wish to have the appended claims read in the light of the broad generic spirit of my invention and not by a restricted interpretation of the circumstantial terminology employed.

What I claim as new and useful and desire to protect by Letters Patent is:

1. A pneumatic tired wheel for vehicles adapted to travel on standard railroads comprising a wheel body having a rail flange adapted to engage the inner edge of the rails of the road after the fashion of the flanges on the standard railway vehicles, a rim base associated with the wheel body, and a pneumatic tire carried upon the rim base, having an inner wall contacting substantially directly with the rim base and adapted to support the weight of the vehicle upon the head of the rail, in which the extent of radial projection of the flange beyond the rim base less the minimum radial overall thickness of the tire when deflated, is less than the vertical distance from the top of the rail head to any lateral projection from the inner face of the rail which extends beyond the vertical plane of that edge of the rail which is engaged by the wheel retaining flange.

2. A wheel for vehicles adapted to travel on standard railways comprising a wheel body having a flange adapted to engage the inner edge of a rail thereby retaining the vehicle upon the railway, a rim base associated with the wheel body and a transversely flatly oblong pneumatic tire carried on the rim base, having an inner wall contacting substantially directly with the rim base and adapted to support the vehicle upon the head of the rail, in which tire the radially outward walls of the tire are collapsible directly upon the radially inward walls and the maximum radial depth of air space between the radially outward and the radially inward walls of the tire is less than the minimum distance obtaining at any time during operation between the periphery of the flange on the wheel body and any projection from the side of the rail inwardly beyond the plane of that edge which is engaged by the flange.

3. A railway vehicle wheel comprising a wheel body having a circumferential retaining flange adapted through engagement of the side of a rail to retain the vehicle upon the railway, a rim base on said wheel body and a pneumatic tire carried by the rim base and adapted to support the vehicle from the head of a rail, which tire is possessed not only of a transversely flatly oblong overall transverse cross section but also of an air space transversely flatly oblong in transverse cross section, and which tire further has a maximum possible tread radius when inflated under all conditions of pressure less than the perimetral radius of said retaining flange by the full extent of its normal depth below the head of the rail, the radial projection of the flange beyond the rim base less the minimum radial over-all thickness of the tire when deflated being less than the vertical distance from the top of the rail head to any radial projection from the inner face of the rail which extends beyond the vertical plane of that edge of the rail which is engaged by the wheel retaining flange.

4. A pneumatic tired wheel for vehicles adapted to travel on standard railroads comprising a wheel body having a rail flange adapted to engage the inner edge of the rails of the road after the fashion of the flanges on the standard railway vehicles, a rim base associated with the wheel body, and a pneumatic tire having a tread annularly substantially cylindrical about the axis of the tire carried upon the rim base and adapted to support the weight of the vehicle from the head of the rail in which the extent of radial projection of the flange beyond the rim base less the minimum radial thickness of the tire when deflated, is less than the distance from the top of the rail head to any lateral projection from the inner face of the rail which extends beyond the vertical plane of that edge of the rail which is engaged by the wheel retaining flange, the inner axially extending walls of said tire being of substantially uniform in radial depth cross section and substantially parallel to each other, together with an annularly wound wire reinforcement in the outer wall cylindrical about the axis of the tire and of a strength sufficient to preserve the cylindrical form of the tread of the flatly oblong tire under all conditions of operating pressure, the widths of the tread and of the said reinforcing winding being greater than the width of the head of the rail upon which the wheel operates.

5. The combination with a rail wheel provided with a retaining flange, of a tire mounted on said wheel and provided with means in its outer peripheral wall for preventing under all conditions of pressure the expansion of said wall beyond a predetermined diameter less by an amount equal to the standard amount of radial projection of the flanges of steel railway wheels beyond their treads in accordance with standard railway practice than the diameter of said flange, the relation between the radial tire depth and the radial flange depth being such that the maximum drop of said retaining flange upon the tire deflation is less than the vertical distance between said flange under normal running conditions and any radial projection from the inner face of the rail which extends beyond the vertical plane of that edge of the rail which is engaged by the wheel retaining flange.

6. In combination, a rail vehicle having a pneumatic tire, a guide flange depending below the plane of tread of said tire, and means embodied in said tire per se for determinately limiting under all conditions of pressure the vertical movement of said flange with respect to the rail with which it coacts in both the deflation and inflation of said tire to a range less than the distance between the guide flange and the nearest projection laterally of the head of the rail into its plane of movement when the tire is inflated and the guide flange projects radially below the rail head to the extent required in standard railway practice.

7. The combination with a rail wheel provided with a retaining flange, of a tire mounted on said wheel having means annularly wound in its outer peripheral wall for preventing under all conditions of retained pressure the expansion of said wall beyond a predetermined diameter less than the diameter of said flange by substantially twice the radial projection of the flange below the rail head to the degree required by standard railway practice, the radial depth of the tire being so related to the radial flange depth as to preclude, in the event of tire deflation, contact of the flange with any radial projection from the inner face of the rail which extends beyond the vertical plane of the edge of the rail engaged by the retaining flange.

8. The combination of a railway wheel provided with a retaining flange, of a tire having a cylindrical tread mounted on said wheel provided with a cylindrical annular metallic winding in its outer peripheral wall for preventing under all conditions of pressure of the tire the expansion of said wall beyond a predetermined diameter less than the diameter of said retaining flange by an amount substantially twice the degree of projection of the guiding flanges of steel railway wheels under standard railway practice, the radial depth of the tire being so related to the radial flange depth as to preclude, in the event of tire deflation, contact of the flange with any radial projection from the inner face of the rail which extends beyond the vertical plane of the edge of the rail engaged by the retaining flange.

9. The combination of a railway wheel provided with a retaining flange, of a tire having a cylindrical tread mounted on said wheel provided with a cylindrical annular metallic winding in its outer peripheral wall for preventing under all conditions of pressure of the tire the expansion of said wall beyond a predetermined diameter less than the diameter of said retaining flange by an amount substantially twice the degree of projection of the guiding flanges of steel railway wheels under standard railway practice, together with flexible elements embodied in said wall transversely thereof and annularly in close proximity to said annular winding, the radial depth of the tire being so related to the radial flange depth as to preclude, in the event of tire deflation, contact of the flange with any radial projection from the inner face of the rail which extends beyond the vertical plane of the edge of the rail engaged by the retaining flange.

EDWARD G. BUDD.